(12) United States Patent
Aldstadt

(10) Patent No.: US 8,255,235 B2
(45) Date of Patent: Aug. 28, 2012

(54) ITEM TRACKING AND ANTICIPATED DELIVERY CONFIRMATION SYSTEM METHOD

(75) Inventor: Harry Aldstadt, Woodbridge, VA (US)

(73) Assignee: United States Postal Service, Washington, DC (US)

( * ) Notice: Subject to any disclaimer, the term of this patent is extended or adjusted under 35 U.S.C. 154(b) by 1554 days.

(21) Appl. No.: 10/488,762

(22) PCT Filed: Sep. 7, 2001

(86) PCT No.: PCT/US01/28001
§ 371 (c)(1),
(2), (4) Date: Mar. 5, 2004

(87) PCT Pub. No.: WO03/023677
PCT Pub. Date: Mar. 20, 2003

(65) Prior Publication Data
US 2004/0249652 A1    Dec. 9, 2004

(51) Int. Cl.
*G06Q 10/00* (2012.01)
*G06Q 15/20* (2006.01)
(52) U.S. Cl. .......................... 705/1; 364/478
(58) Field of Classification Search .................... 700/115
See application file for complete search history.

(56) References Cited

U.S. PATENT DOCUMENTS

| | | |
|---|---|---|
| 472,105 A | 4/1892 | Bussard |
| 481,772 A | 8/1892 | Spear |
| 1,750,339 A | 3/1930 | Wood |
| 3,229,903 A | 1/1966 | Smith |
| 4,135,662 A | 1/1979 | Dlugos |
| 4,309,569 A | 1/1982 | Merkle |
| 4,574,352 A | 3/1986 | Coppola et al. |
| 4,725,718 A | 2/1988 | Sansone et al. |
| 4,727,368 A | 2/1988 | Larson et al. |
| 4,778,201 A | 10/1988 | Kouno et al. |
| 4,816,824 A | 3/1989 | Katz et al. |
| 4,831,555 A | 5/1989 | Sansone et al. |
| 5,043,908 A * | 8/1991 | Manduley et al. ............ 700/227 |
| 5,136,646 A | 8/1992 | Haber et al. |
| 5,136,647 A | 8/1992 | Haber et al. |
| 5,223,829 A | 6/1993 | Watabe |
| 5,227,778 A | 7/1993 | Vacon et al. |
| 5,315,508 A * | 5/1994 | Bain et al. ........................ 705/28 |
| 5,341,505 A | 8/1994 | Whitehouse |
| 5,373,561 A | 12/1994 | Haber et al. |
| 5,377,354 A | 12/1994 | Scannell et al. |

(Continued)

FOREIGN PATENT DOCUMENTS

EP    0 516 898 A1    12/1992

(Continued)

OTHER PUBLICATIONS

"Third Party Privacy System" Dec. 23, 1999, WO 99/66428 to Zucker et al.*

(Continued)

*Primary Examiner* — Garcia Ade
(74) *Attorney, Agent, or Firm* — Finnegan, Henderson, Farabow, Garrett & Dunner, LLP

(57) ABSTRACT

This disclosure describes systems and methods for electronically tracking information. The tracking information may includes arrival information regarding an arrival of the item and processing information regarding processing of the item.

13 Claims, 16 Drawing Sheets

U.S. PATENT DOCUMENTS

| | | | |
|---|---|---|---|
| 5,387,783 A | 2/1995 | Mihm et al. | |
| 5,404,231 A | 4/1995 | Bloomfield | |
| RE34,954 E | 5/1995 | Haber et al. | |
| 5,422,821 A | 6/1995 | Allen et al. | |
| 5,481,464 A | 1/1996 | Ramsden | |
| 5,490,077 A | 2/1996 | Freytag | |
| 5,573,178 A | 11/1996 | Worden | |
| 5,619,648 A | 4/1997 | Canale et al. | |
| 5,631,827 A | 5/1997 | Nicholls et al. | |
| 5,638,446 A | 6/1997 | Rubin | |
| 5,648,916 A | 7/1997 | Manduley et al. | |
| 5,666,215 A | 9/1997 | Fredlund | |
| 5,701,770 A | 12/1997 | Cook et al. | |
| 5,703,951 A | 12/1997 | Dolphin | |
| 5,710,887 A | 1/1998 | Chelliah et al. | |
| 5,717,597 A | 2/1998 | Kara | |
| 5,729,594 A | 3/1998 | Klingman | |
| 5,742,829 A | 4/1998 | Davis et al. | |
| 5,752,059 A | 5/1998 | Holleran et al. | |
| 5,774,053 A | 6/1998 | Porter | |
| 5,774,086 A | 6/1998 | Guyot | |
| 5,781,629 A | 7/1998 | Haber et al. | |
| 5,796,841 A | 8/1998 | Cordery et al. | |
| 5,805,810 A | 9/1998 | Maxwell | |
| 5,819,240 A | 10/1998 | Kara | |
| 5,835,087 A | 11/1998 | Herz et al. | |
| 5,841,550 A | 11/1998 | Johnson | |
| 5,852,813 A | 12/1998 | Guenther et al. | |
| 5,857,188 A | 1/1999 | Douglas | |
| 5,870,549 A | 2/1999 | Bobo | |
| 5,873,605 A | 2/1999 | Kaplan | |
| 5,878,233 A | 3/1999 | Schloss | |
| 5,883,810 A | 3/1999 | Franklin et al. | |
| 5,895,455 A * | 4/1999 | Bellinger et al. | 705/35 |
| 5,903,878 A | 5/1999 | Telati et al. | |
| 5,910,987 A | 6/1999 | Ginter et al. | |
| 5,917,411 A | 6/1999 | Baggarly | |
| 5,917,925 A | 6/1999 | Moore | |
| 5,920,847 A | 7/1999 | Kolling et al. | |
| 5,923,406 A | 7/1999 | Brasington et al. | |
| 5,930,479 A | 7/1999 | Hall | |
| 5,943,656 A | 8/1999 | Crooks et al. | |
| 5,944,787 A | 8/1999 | Zoken | |
| 5,971,587 A | 10/1999 | Kato et al. | |
| 5,979,750 A | 11/1999 | Kindell | |
| 5,999,967 A | 12/1999 | Sundsted | |
| 6,006,200 A | 12/1999 | Boies et al. | |
| 6,023,723 A | 2/2000 | McCormick et al. | |
| 6,028,517 A | 2/2000 | Sansone et al. | |
| 6,032,133 A | 2/2000 | Hilt et al. | |
| 6,035,402 A | 3/2000 | Vaeth et al. | |
| 6,047,264 A * | 4/2000 | Fisher et al. | 705/26.44 |
| 6,052,709 A | 4/2000 | Paul | |
| 6,064,995 A | 5/2000 | Sansone et al. | |
| 6,070,793 A | 6/2000 | Reichl et al. | |
| 6,070,798 A | 6/2000 | Nethery | |
| 6,081,899 A | 6/2000 | Byrd | |
| 6,138,910 A | 10/2000 | Madruga | |
| 6,148,289 A | 11/2000 | Virdy | |
| 6,152,369 A * | 11/2000 | Wilz et al. | 235/462.01 |
| 6,161,130 A | 12/2000 | Horvitz et al. | |
| 6,199,102 B1 | 3/2001 | Cobb | |
| 6,219,669 B1 | 4/2001 | Haff et al. | |
| 6,233,565 B1 | 5/2001 | Lewis et al. | |
| 6,233,568 B1 | 5/2001 | Kara | |
| 6,243,620 B1 | 6/2001 | Robinson et al. | |
| 6,246,925 B1 | 6/2001 | Robinson et al. | |
| 6,247,149 B1 | 6/2001 | Falls et al. | |
| 6,259,964 B1 | 7/2001 | Robinson | |
| 6,275,154 B1 | 8/2001 | Bennett et al. | |
| 6,282,658 B2 | 8/2001 | French et al. | |
| 6,285,777 B2 | 9/2001 | Kanevsky et al. | |
| 6,285,991 B1 | 9/2001 | Powar | |
| 6,289,323 B1 | 9/2001 | Gordon et al. | |
| 6,292,789 B1 | 9/2001 | Schutzer | |
| 6,300,873 B1 | 10/2001 | Kucharczyk et al. | |
| 6,308,277 B1 | 10/2001 | Vaeth et al. | |
| 6,321,333 B1 | 11/2001 | Murray | |
| 6,321,339 B1 | 11/2001 | French et al. | |
| 6,323,782 B1 | 11/2001 | Stephens et al. | |
| 6,339,795 B1 | 1/2002 | Narurkar et al. | |
| 6,347,737 B1 | 2/2002 | Madruga | |
| 6,394,565 B1 | 5/2002 | Greenhalgh | |
| 6,405,523 B1 | 6/2002 | Foust | |
| 6,425,521 B1 | 7/2002 | Cooper | |
| 6,430,457 B1 * | 8/2002 | Van De Loo | 700/115 |
| 6,438,690 B1 | 8/2002 | Patel et al. | |
| 6,442,571 B1 | 8/2002 | Haff et al. | |
| 6,446,045 B1 | 9/2002 | Stone et al. | |
| 6,460,050 B1 | 10/2002 | Pace et al. | |
| 6,463,354 B1 | 10/2002 | Pintsov | |
| 6,480,885 B1 | 11/2002 | Olivier | |
| 6,493,685 B1 | 12/2002 | Ensel et al. | |
| 6,496,936 B1 | 12/2002 | French et al. | |
| 6,587,945 B1 | 7/2003 | Pasieka | |
| 6,604,132 B1 | 8/2003 | Hitt | |
| 6,644,542 B2 | 11/2003 | Cox et al. | |
| 6,651,063 B1 | 11/2003 | Vorobiev | |
| 6,654,448 B1 | 11/2003 | Agraharam et al. | |
| 6,675,153 B1 | 1/2004 | Cook et al. | |
| 6,691,231 B1 | 2/2004 | Lloyd et al. | |
| 6,711,624 B1 | 3/2004 | Narurkar et al. | |
| 6,741,724 B1 | 5/2004 | Bruce et al. | |
| 6,745,327 B1 | 6/2004 | Messing | |
| 6,775,782 B1 | 8/2004 | Buros et al. | |
| 6,807,530 B1 | 10/2004 | Shub et al. | |
| 6,882,269 B2 | 4/2005 | Moreno | |
| 6,917,948 B2 | 7/2005 | Campbell | |
| 6,933,832 B1 | 8/2005 | Simms et al. | |
| 6,967,575 B1 | 11/2005 | Dohrmann et al. | |
| 6,972,859 B1 | 12/2005 | Patton et al. | |
| 6,978,929 B2 | 12/2005 | Buie | |
| 6,983,194 B1 | 1/2006 | Stadermann | |
| 7,076,458 B2 | 7/2006 | Lawlor et al. | |
| 7,080,041 B2 | 7/2006 | Nagel | |
| 7,158,941 B1 | 1/2007 | Thompson | |
| 7,194,957 B1 | 3/2007 | Leon et al. | |
| 7,236,970 B1 | 6/2007 | Winslow | |
| 7,295,997 B2 | 11/2007 | Estes | |
| 7,337,944 B2 | 3/2008 | Devar | |
| 7,340,600 B1 | 3/2008 | Corella | |
| 7,346,591 B2 | 3/2008 | Sansone | |
| 7,437,414 B2 | 10/2008 | Dean | |
| 7,441,277 B2 | 10/2008 | Burges et al. | |
| 7,484,088 B2 | 1/2009 | Campbell | |
| 2001/0011274 A1 | 8/2001 | Klug et al. | |
| 2001/0020235 A1 | 9/2001 | Game | |
| 2001/0032115 A1 | 10/2001 | Goldstein | |
| 2001/0032181 A1 | 10/2001 | Jakstadt et al. | |
| 2001/0044785 A1 | 11/2001 | Stolfo et al. | |
| 2002/0002590 A1 | 1/2002 | King et al. | |
| 2002/0004900 A1 | 1/2002 | Patel | |
| 2002/0023059 A1 | 2/2002 | Bari et al. | |
| 2002/0024438 A1 | 2/2002 | Roberson | |
| 2002/0032597 A1 | 3/2002 | Chanos | |
| 2002/0033598 A1 | 3/2002 | Beasley | |
| 2002/0049672 A1 | 4/2002 | Kitchen et al. | |
| 2002/0063148 A1 | 5/2002 | Cox et al. | |
| 2002/0069174 A1 | 6/2002 | Fox et al. | |
| 2002/0103868 A1 | 8/2002 | Khan | |
| 2002/0111907 A1 | 8/2002 | Ling | |
| 2002/0143462 A1 | 10/2002 | Warren | |
| 2002/0165772 A1 | 11/2002 | Nakazawa et al. | |
| 2003/0023561 A1 | 1/2003 | Stefik et al. | |
| 2003/0077409 A1 | 4/2003 | Schnell | |
| 2003/0140017 A1 | 7/2003 | Patton et al. | |
| 2003/0187951 A1 | 10/2003 | Shen | |
| 2004/0002903 A1 | 1/2004 | Stolfo et al. | |
| 2004/0122780 A1 | 6/2004 | Devar | |
| 2004/0243690 A1 * | 12/2004 | Hancock et al. | 709/219 |
| 2005/0033659 A1 | 2/2005 | Zucker et al. | |
| 2007/0239569 A1 * | 10/2007 | Lucas et al. | 705/28 |
| 2008/0133411 A1 | 6/2008 | Jones et al. | |
| 2008/0306758 A1 * | 12/2008 | Chalmers et al. | 705/1 |

FOREIGN PATENT DOCUMENTS

| | | |
|---|---|---|
| EP | 0893787 A3 | 1/1999 |
| JP | 10-124488 | 5/1988 |
| WO | WO 97/12460 | 4/1997 |
| WO | WO 99/16226 A1 | 4/1999 |
| WO | WO 99/66428 | 12/1999 |
| WO | WO 00/13368 | 3/2000 |
| WO | WO 01/00069 | 1/2001 |
| WO | WO 01/00069 A2 | 1/2001 |
| WO | WO 01/18718 A1 | 3/2001 |
| WO | WO 01/65444 A1 | 9/2001 |
| WO | WO 01/99005 A1 | 12/2001 |
| WO | WO 01/99009 A2 | 12/2001 |
| WO | WO 01/99037 A1 | 12/2001 |
| WO | WO 02/08961 A1 | 1/2002 |
| WO | WO 02/21315 | 3/2002 |
| WO | WO 02/21315 A1 | 3/2002 |
| WO | WO 0233604 A2 | 4/2002 |
| WO | WO 02/066344 A1 | 8/2002 |
| WO | WO 02/079947 A2 | 10/2002 |
| WO | WO 02/0799947 A2 | 10/2002 |
| WO | WO 03/023677 A1 | 3/2003 |

OTHER PUBLICATIONS

Campbell et al., "Systems and Methods for Authenticating an Electronic Message," Pending U.S. Appl. No. 09/675,667, filed Sep. 29, 2000.

Campbell et al., "Methods and Systems for Proofing Identities Using a Certificate Authority," Pending U.S. Appl. No. 09/809,325, filed Mar. 16, 2001.

Orbke et al., "Methods and Systems for Establishing an Electronic Account for a Customer," Pending U.S. Appl. No. 09/809,328, filed Mar. 16, 2001.

Cook et al., "Methods and Systems for Providing a Secure Electronic Mailbox," Pending U.S. Appl. No. 09/809,312, filed Mar. 16, 2001.

Campbell et al., "Methods and Systems for Providing an Electronic Account to a Customer," Pending U.S. Appl. No. 09/809,581, filed Mar. 16, 2001.

Cook et al., "Methods and Systems for Linking an Electronic Address to a Physical Address of a Customer," Pending U.S. Appl. No. 09/809,326, filed Mar. 16, 2001.

Estes et al., "System, Method, and Article of Manufacturing for Shipping a Package Privately to a Customer," Pending U.S. Appl. No. 10/311,748, corresponding to international application No. PCT/US01/19384, international filing date: Jun. 19, 2001 (specification provided as WO 01/99005 A1).

Krause et al., "Systems and Methods for Electronic Message Content Identification," Pending U.S. Appl. No. 10/311,743, corresponding to international application No. PCT/US01/19698, international filing date: Jun. 20, 2001 (specification provided as WO 01/99009 A2).

Replacement Sheet for p. 1 of international application No. PCT/US01/19698 (published as WO 01/99009 A2) submitted to U.S. Patent and Trademark Office, Box PCT, on Jan. 18, 2002.

Buie et al., "Systems and Methods for Providing Mail Item Retrieval," Pending U.S. Appl. No. 10/311,742, corresponding to international application No. PCT/US01/19421, international filing date: Jun. 19, 2001 (specification provided as WO 01/99037 A1).

Sadler et al., "Item Attribute Preverification," Pending U.S. Appl. No. 10/333,841, corresponding to international application No. PCT/US01/23177, international filing date: Jul. 24, 2001 (specification provided as WO 02/08961 A1).

Campbell, "Systems and Methods for Providing Electronic Archiving," Pending U.S. Appl. No. 10/362,506, corresponding to international application No. PCT/US01/27690, international filing date: Sep. 7, 2001 (specification provided as WO 02/21315 A1).

Devar, "Universal Delivery and Collection Box Unit (UDCBU)," Pending U.S. Appl. No. 10/468,364, corresponding to international application No. PCT/US02/04866, international filing date: Feb. 20, 2002 (specification provided as WO 02/066344 A1).

Devar, "Universal Delivery and Collection Box Unit," Pending U.S. Appl. No. 10/473,873, corresponding to international application No. PCT/US02/09870, international filing date: Apr. 2, 2002 (specification provided as WO 02/079947 A2).

International Search Report, PCT/US00/27068, mailed May 4, 2001 (4 pages).

International Search Report in PCT/US01/23177, mailed Oct. 18, 2001 (4 pages).

International Search Report in PCT/US01/19384, mailed Nov. 16, 2001 (6 pages).

International Search Report in PCT/US01/19421, mailed Nov. 19, 2001 (6 pages).

International Search Report in PCT/US01/27690, mailed Nov. 19, 2001 (5 pages).

International Search Report in PCT/US01/28001, mailed Dec. 21, 2001 (7 pages).

International Search Report in PCT/US01/08490, mailed Jan. 22, 2002 (6 pages).

International Search Report in PCT/US02/04866, mailed May 23, 2002 (1 page).

International Search Report in PCT/US02/09870, mailed Dec. 5, 2002 (2 pages).

International Preliminary Examination Report in PCT/US01/08487, mailed Jan. 23, 2002 (4 pages).

International Preliminary Examination Report in PCT/US01/23177, mailed May 3, 2002 (4 pages).

International Preliminary Examination Report in PCT/US01/19421, mailed May 16, 2002 (4 pages).

International Preliminary Examination Report in PCT/US01/19384, mailed Jan. 17, 2003 (4 pages).

International Preliminary Examination Report in PCT/US01/08488, mailed Jun. 11, 2003 (10 pages).

International Preliminary Examination Report in PCT/US01/28001, mailed Aug. 8, 2003 (4 pages).

PCT Written Opinion (PCT Rule 66) in PCT/US01/19384, mailed Jun. 17, 2002 (4 pages).

PCT Written Opinion (PCT Rule 66) in PCT/US01/08488, mailed Oct. 28, 2002 (9 pages).

PCT Written Opinion (PCT Rule 66) in PCT/US02/09870, mailed Mar. 6, 2003 (5 pages).

PCT Written Opinion (PCT Rule 66) in PCT/US02/04866, mailed May 23, 2003 (4 pages).

Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. U.S. Appl. No. 60/255,407, filed Dec. 15, 2000, which is incorporated by reference into Pending U.S. Appl. No. 10/311,742, filed Dec. 19, 2002).

Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Bartholomew, D., "The Future of Snail Mail: the Postal Service Is Gearing up for Competition. But Can It Deliver?," InformationWeek, Dec. 4, 1995, starting p. 34, retrieved from Dialog, Dialog No. 08306634 (6 pages).

Bhushan, B. et al., "Federated Accounting: Service Charging and Billing in a Business-to-Business Environment," 2001 IEEE/IFIP International Symposium, May 14-18, 2001, pp. 107-121.

"CONNECT announces OneServer interactive online application platform," Business Wire, Apr. 10, 1995, p. 4101043, retrieved from Dialog, Dialog No. 07797909 (2 pages).

Czerny, M., "Customer Account Management System for STEWEAG Key Accounts," CIRED 97 Conference Publication No. 438, Jun. 2-5, 1997, pp. 5.6.1 to 5.6.5.

"Joint Direct Bill Payment Form for Mich. Utilities," Bank Technology News, Apr. 1994, p. 8, retrieved from Dialog, Dialog No. 03302326 (1 page).

Newkirk, K.M., "Banks Can Slice Transaction Costs," Independent Banker, Dec. 1995, vol. 45, No. 12, pp. 52-53, retrieved from Dialog, Dialog No. 00276769 (3 pages).

Selected pages (9-11, 18-19, 28-32) from "Recommendation F.400/X.400 Message Handling and Directory Services—Operation and Definition of Service," Nov. 14, 1988, CCITT, Melbourne, XP002186347 (10 pages).

Stafford, C.D. et al., "Delivering Marketing Expertise to the Front Lines," IEEE Expert, Apr. 1994, pp. 23-32.

Fast Facts, Back Issue [online]., pp. 1-4, FedEx Oct. 11, 2000 [retrieved on Nov. 28, 2001]. Retrieved from the internet: <URL: www.fedex.com/us/customer/fastfacts/backissues/101100fastfacts. html>.

eBusiness Tools, FedEx Ship Manager Software [online]., pp. 1-2, FedEx, [Retrieved Nov. 28, 2001]. Retrieved from the Internet; <URL: www.fedex.com/us/ebusiness/eshipping/ship.htmt>.

Campbell, Sharon Lynn , "A new look for MSDS." Occupational Health and Safety, Waco: Jun 1992. vol. 61, Issue 6; p. 62 [retrieved from ProQuest Dec. 19, 2005] (5 pages).

Aldstadt, "Item Tracking and Anticipated Delivery Confirmation System Method," Pending U.S. Appl. No. 10/488,762, corresponding to international application No. PCT/US01/28001, international filing date: Sep. 7, 2001 (specification provided as WO 03/023677 A1).

"Export management firms provide alternatives". Anonymous. Carin's Chicago Business. Chicago: Dec. 12, 1983. vol. 6, Issue 50; p. 17 [retrieved from ProQuest Dec. 19, 2005] (1 page).

"Faster Freight: Couriers and Expedited Carries Broaden Their Approach to Better Server Canadian Shippers," Materials Management and Distribution, Toronto, Oct. 1996, vol. 41, Issue 10, pp. 34.

Bachmann, et al., "Implementing LDAP Search Queries with SQL," Dec. 1, 1998, IBM TDB, (7 pages).

"American Express Invests in Respond.com," M2 Presswire, Mar. 9, 2000 [recovered from Dialog database on Jun. 5, 2007] (2 pages).

Carbone, Jim , "Purchasing tools for the Internet toolbox," Purchasing, vol. 123, No. 9, Dec. 11, 1997 (5 pages).

Yoegel, Rob, "Fulfillment on the Net," Target Marketing, Jul. 1996 [recovered from Dialog database on Jul. 17, 2007] (4 pages).

Co-Pending U.S. Appl. No. 11/179,546; Title: Methods and Systems For Establishing An Electronic Account For A Customer; filed Jul. 13, 2005.

Co-Pending U.S. Appl. No. 11/525,203; Title: Methods and Systems For Providing a Secure Electronic Mailbox; filed Sep. 22, 2006.

Co-Pending U.S. Appl. No. 12/219,269, Title: Methods and Systems for Proofing Identities Using a Certificate Authority, filed Jul. 18, 2008.

Co-Pending U.S. Appl. No. 12/219,268, Title: Methods and Systems for Proofing Identities Using a Certificate Authority, filed Jul. 18, 2008.

Co-Pending U.S. Appl. No. 12/219,657, Title: Methods and Systems for Proofing Identities Using a Certificate Authority, filed Jul. 25, 2008.

Office Action Issued in U.S. Appl. No. 11/656,416, dated Oct. 20, 2009 (13 pages).

Office Action Issued in U.S. Appl. No. 11/656,416, dated Nov. 21, 2008 (15 pages).

Office Action mailed Oct. 13, 2009 in corresponding U.S. Appl. No. 10/311,743.

Article 34 Amendments—Letter Accompanying Replacement Sheets from PCT/US01/19698 (published as WO 01/99009), dated Jan. 18, 2002, 2 pages.

International Preliminary Examination Report in PCT/US01/08488, mailed Jun. 11, 2003, 10 pages.

Q165: What is X.509 http://members.x5.net/faqs/crypto/q165.html Feb. 1, 1998.

"Recommendation F .400/x.400 message handling and directory services—operation and definition of service," Nov. 14, 1988, CCITT, Melbourne, XP002186347 (10 pages).

Samoriski, Jan H. "Unsolicited Commercial E-mail, the Internet and the First Amendment: Another Free Speech Showdown in Cyberspace?", 1999 Broadcast Education Association, Journal of Broadcasting & Electronic Media, pp. 670-689.

Stephens, G., "Australia to Personalize New Stamps with Photographs of Show Visitors," Linn's Stamp News [on line], Mar. 22, 1999. (Retrieved on May 3, 2002 from www.lins.com/print/archives/20000403/news3.asp). (3 pages).

International Search Report for PCT/US01/47721 issued May 2, 2002 (2 pages).

Security of digital signature with one-time pair of keys [comment] Yuh-Min Tseng; Jinn-Ke Jan; Hung-Yu Chien; Electronics Letters, vol. 36, Issue: 16, Aug. 3, 2000 (2 pages).

S-ARP: a secure address resolution protocol Bruschi, D.; Omaghi, A.; Rosti, E.; Computer Security Applications Conference, 2003. Proceedings. 19th Annual, Dec. 8-12, 2003 (12 pages).

Construction of a policy of safety in CA structures Efimov, I.N.; Kozub, A.A.; Kiseleva, I.A.; Electron Devices and Materials, 2004. Proceedings. 5$^{th}$ Annual 2004 International Siberian Workshop on , Jul. 1-5, 2004 (2 pages).

* cited by examiner

First Barcode          Second Barcode

0

1

2

3

4

5

6

7

8

9

| 75099 | , 891 , | 02/09/1998 | 17:21 , | 85072225252 , | 21040362003 |
|---|---|---|---|---|---|
| 75099 | , 891 , | 02/09/1998 | 11:45 , | 85072225252 , | 21040572389 |
| 75099 | , 891 , | 02/09/1998 | 17:44 , | 85072225252 , | 21040578772 |
| 75099 | , 891 , | 02/09/1998 | 14:52 , | 85072225252 , | 21040620805 |
| 75099 | , 891 , | 02/09/1998 | 14:54 , | 85072225252 , | 21040746128 |
| 75099 | , 891 , | 02/09/1998 | 17:37 , | 85072225252 , | 21040781227 |
| 75099 | , 891 , | 02/09/1998 | 17:30 , | 85072225252 , | 21040828788 |
| 75099 | , 891 , | 02/09/1998 | 15:29 , | 85072225252 , | 21040888812 |
| 75099 | , 891 , | 02/09/1998 | 14:35 , | 85072225252 , | 21040892614 |
| 75099 | , 891 , | 02/09/1998 | 14:00 , | 85072225252 , | 21040904851 |
| 75099 | , 891 , | 02/09/1998 | 15:01 , | 85072225252 , | 21040932624 |
| 75099 | , 891 , | 02/09/1998 | 19:21 , | 85072225252 , | 21040935602 |
| 75099 | , 892 , | 02/09/1998 | 18:10 , | 85072225252 , | 21040935704 |
| 75099 | , 891 , | 02/09/1998 | 12:50 , | 85072225252 , | 21040935760 |
| 75099 | , 891 , | 02/09/1998 | 12:49 , | 85072225252 , | 21040953169 |
| 75099 | , 891 , | 02/09/1998 | 17:39 , | 85072225252 , | 21040953450 |
| 75099 | , 891 , | 02/09/1998 | 18:17 , | 85072225252 , | 21040955297 |
| 75099 | , 891 , | 02/09/1998 | 11:33 , | 85072225252 , | 21040955877 |
| 900 | 910 | 920 | 930 | 250 | 700 |

| | Record for Shipment | |
|---|---|---|
| 1102 — Shipment ID | UT000012345000001238 | — 1134 |
| 1104 — Facility Code | 36106 | |
| 1106 — Est Drop Date | 05102001 | |
| 1108 — Est Drop Time | 1600 | |
| 1110 — Appointment Number | 208980510006 | |
| 1112 — Subscriber ID | 000012345 | |
| 1114 — Items ID | 00000112 | |
| 1116 — Items Name | Spring Sale | |
| 1118 — Service Code | 43 | |
| 1120 — Number Second Barcodes | 0001 | |
| 1122 — Tot Number of Items Dropped | 9900000 | |
| 1124 — Del Window Start | 05212001 | |
| 1126 — Del Window End | 05232001 | |
| 1128 — Presort Level | 015 | |
| 1130 — Second Barcode | 43123450246 | |
| 1132 — Num Items Second Barcode Coded | 9900000 | |

Fig. 11A

|  |  | 1134B | 1136B | 1138B | 1140B |
|---|---|---|---|---|---|
|  |  | Record for Shipment 1 | Record for Shipment 2 | Record for Shipment 3 | Record for Shipment 4 |
| 1102 | Shipment ID | UT000012 3450 00001 261 | UT000012345000001250 | UT000012345000001249 | UT000012345000001238 |
| 1104 | Facility Code | 41099 | 90210 | 22042 | 36108 |
| 1106 | Est Drop Date | 05112 001 | 05112 001 | 05112 001 | 05102 001 |
| 1108 | Est Drop Time | 16 00 | 16 00 | 16 00 | 16 00 |
| 1110 | Appointment Number | 410990511013 | 902Z_05110 12 | 220420511002 | 36Z_05100 01 |
| 1112 | Subscriber ID | 000012 345 | 000012 345 | 000012 345 | 000012 345 |
| 1114 | Items ID | 00000 012 | 00000 012 | 00000 012 | 00000 012 |
| 1116 | Items Name | Spring Sale | Spring Sale | Spring Sale | Spring Sale |
| 1118 | Service Code | 43 | 43 | 43 | 43 |
| 1120 | Number Second Barcode | 00 04 | 00 04 | 00 04 | 00 04 |
| 1122 | Tot Number of Items Dropped | 99000 | 99000 | 99000 | 99000 |
| 1124 | Del Window Start | 05212 001 | 05212 001 | 05212 001 | 05212 001 |
| 1126 | Del Window End | 05232 001 | 05232 001 | 05232 001 | 05232 001 |
| 1128 | Presort Level | 015 | 015 | 015 | 015 |
| 1130 | Second Bar code | 431234502 49 | 431234502 48 | 431234502 47 | 431234502 46 |
| 1132 | Num Items Second Bar code Coded | 99000 | 99000 | 99000 | 99000 |

Fig. 11B

|  |  | 1134C | 1136C | 1138C | 1140C |
|---|---|---|---|---|---|
|  |  | Record for Subscriber 1 | Record for Subscriber 2 | Record for Subscriber 3 | Record for Subscriber 4 |
| 11 02 | Shipment ID | UT000012345000001238 | UT000012345000001238 | UT000012345000001238 | UT000012345000001238 |
| 11 04 | Facility Code | 36106 | 36106 | 36106 | 36106 |
| 11 06 | Est Drop Date | 05102 001 | 05102 001 | 05102 001 | 05102 001 |
| 11 08 | Est Drop Time | 16 00 | 16 00 | 16 00 | 16 00 |
| 11 10 | Appointment Number | 361060510002 | 361060510002 | 361060510002 | 361060510002 |
| 11 12 | Subscriber ID | 000098 987 | 000024 678 | 000032 165 | 000012 345 |
| 11 14 | Items ID | 00000 321 | 00003 245 | 00000 376 | 00000 112 |
| 11 16 | Items Name | US Open Special | New Fall Merchandise | Discount Days | Spring Sale |
| 11 18 | Service Code | 43 | 43 | 43 | 43 |
| 11 20 | Number Second Bar codes | 00 01 | 00 01 | 00 01 | 00 01 |
| 11 22 | Tot Number of Mail Pieces Dropped | 100 0000 | 10 0000 | 25000 | 10 0000 |
| 11 24 | Del Window Start | 05212 001 | 05212 001 | 05222 001 | 05212 001 |
| 11 26 | Del Window End | 05232 001 | 05232 001 | 05242 001 | 05232 001 |
| 11 28 | Presort Level | 015 | 015 | 015 | 015 |
| 11 30 | PLANET Code | 439898745 89 | 432467823 23 | 433218500 24 | 431234502 46 |
| 11 32 | Num Items Second Car code Coded | 10 0000 | 10 0000 | 25000 | 50000 |

| | | Record for Shipment 1 | Record for Shipment 2 | Record for Shipment 3 | Record for Shipment 4 |
|---|---|---|---|---|---|
| 11 02 | Shipment ID | UT000012345000001261 | UT000012345000001250 | UT000012345000001249 | UT000012345000001238 |
| 11 04 | Facility Code | 41099 | 90210 | 22042 | 36106 |
| 11 06 | Est Drop Date | 05112 001 | 05112 001 | 05112 001 | 05102 001 |
| 11 08 | Est Drop Time | 16 00 | 16 00 | 16 00 | 16 00 |
| 11 10 | Appointment Number | 410990511013 | 902Z_05110 12 | 220420511002 | 36Z_05100 01 |
| 11 12 | Subscriber ID | 00 0012 345 | 000012 345 | 000012 345 | 000012 345 |
| 11 14 | Items ID | 00000 012 | 00000 012 | 00000 012 | 00000 012 |
| 11 16 | Items Name | Spring Sale | Spring Sale | Spring Sale | Spring Sale |
| 11 18 | Service Code | 43 | 43 | 43 | 43 |
| 11 20 | Number Second Bar codes | 00 01 | 00 01 | 00 01 | 00 01 |
| 11 22 | Tot Number of Items Dropped | 99000 | 99000 | 99000 | 99000 |
| 11 24 | Del Window Start | 05212 001 | 05212 001 | 05212 001 | 05212 001 |
| 11 26 | Del Window End | 05232 001 | 05232 001 | 05232 001 | 05232 001 |
| 11 28 | Presort Level | 0 15 | 0 15 | 0 15 | 0 15 |
| 11 30 | PLANET Code | 431234502 46 | 431234502 46 | 431234502 46 | 431234502 46 |
| 11 32 | Num Items Second Barcode | 99000 | 99000 | 99000 | 99000 |

Fig. 11D

ITEM TRACKING AND ANTICIPATED DELIVERY CONFIRMATION SYSTEM METHOD

FIELD OF THE INVENTION

The present invention relates to a method and system for tracking and delivering items being shipped. More particularly, the invention relates to a method and system for electronically tracking items in a processing and delivery system and providing a customer access to item tracking information.

BACKGROUND OF THE INVENTION

An ongoing goal of shipping companies that ship items from a sender to a recipient is to provide customers with valuable information regarding the items being shipped. It is therefore desirable to enable customers to access processing information regarding incoming and outgoing items. Particularly, it is desirable to inform customers when a shipping company takes possession of an item and to provide customers with a unique identification for monitoring the item.

SUMMARY OF THE INVENTION

In accordance with the invention, a method for providing tracking information for an item being shipped, associated with a shipping customer may include receiving anticipated arrival information from the customer regarding an anticipated arrival of the item. The anticipated arrival information may include a predetermined shipment identification identifying an anticipated shipment associated with the item, and a predetermined customer identification identifying the customer. The method may further include receiving a first shipment with a first shipment identification, comparing the first shipment identification to the predetermined shipment identification, and notifying the customer with confirmed arrival information when the first shipment identification matches the predetermined shipment identification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 9 is a block diagram illustrating an exemplary output provided to subscribers to an origin or destination confirmation service;

FIGS. 11a, 11b, 11c, and 11d are diagrams illustrating various embodiments of advance shipping notice (ASN) data that may be provided in an ASN data file by a subscriber for verified items according to the present invention.

DESCRIPTION OF THE EMBODIMENTS

Reference will now be made in detail to the present preferred embodiments of the invention illustrated in the accompanying drawings. Wherever possible, the same reference numbers are used throughout the drawings to refer to the same or like parts.

Figure 1:
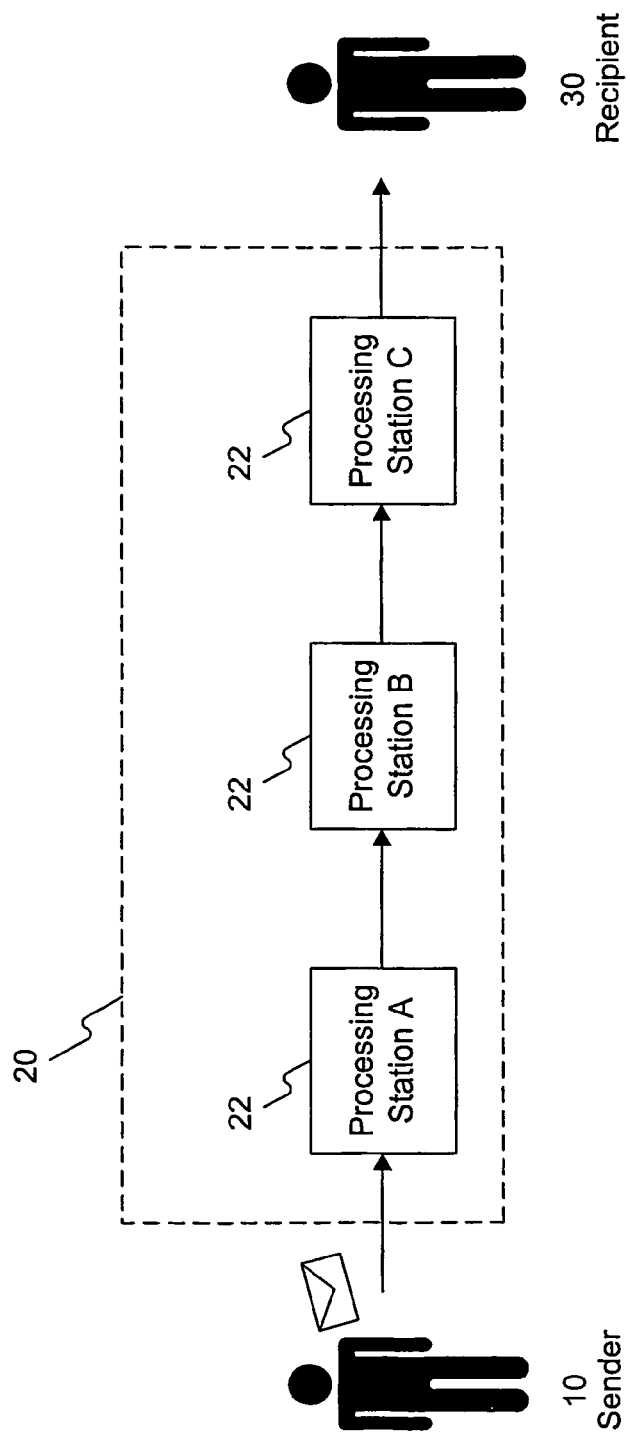
FIG. 1 is a block diagram illustrating a customer submitting an item in a conventional shipping system.

FIG. 1 is a block diagram illustrating a customer submitting an item in a conventional shipping system. The system may include a sender 10, an item processing center 20 comprising processing stations A-C 22A, 22B, and 22C, and a recipient 30. The item may be a mail piece having any dimension, configuration, types of article, or form of container. For example, the mail piece may include a box, parcel, bundle, packet, envelope, etc. The mail piece may be a single piece from a larger mailing from sender 10. A carrier, such as a delivery truck, may transport the deposited item from sender 10 to item processing center 20.

At item processing center 20, processing stations A-C 22A, 22B, and 22C may process each item. For example, at processing station A 22A, workers may sort the items to identify and separate return items from non-return or regular items. Return items may include a mail piece, such as a post card, form, or package, returned by a recipient to a customer or vendor, typically without prepayment of a shipping fee or postage by the sender. Postage and fees may be collected when the item is delivered to the addressee who originally distributed the return item. At processing station B 22B, workers may further sort return items based on a customer or vendor to whom the item is being returned. At processing station C 22C, workers may further process regular items for delivery to a recipient.

Alternatively, items may be received from sender 10 at various presorting levels corresponding to reduced shipping rates. For example, in one embodiment a sender may sort the items to a fine level, e.g., by delivery carrier route, so that item processing center 20 may deliver the items immediately. In another embodiment, a sender may perform a primary sortation of the items that require further sorting by item processing center 20. In still another embodiment, described above, sender 10 may perform no item sorting. Regardless of the presorting level, at each processing station 22A-C, workers for item processing center 20 may perform a number of item processing tasks, such as identifying a type of service requested for each item and determining whether a shipping fee or postage for the type of service requested is sufficient.

As shown in FIG. 1, however, processing stations A-C do not have a central connection. Thus, workers for item processing center 20 do not have any information regarding an item beyond the information printed on the item. For example, a worker at processing station B does not know the location, date, or time that an item was last processed. Similarly, a customer only knows upon receipt or confirmation of receipt by recipient 30, for example, whether item processing center 20 received an item and/or began processing.

To aid item processing center 20 in delivering an item, a barcode identifying the delivery address of an item, such as a first barcode, may be applied to the item. Computer-controlled, high-speed machines may sort items using a barcode reader to interpret the first barcode. The barcode sorter may include an item feed, transport unit, and stackers, for example. Further, item processing center 20 may create the first barcode or a customer may create the first barcode in exchange for reduced shipping rates.

Figure 2:
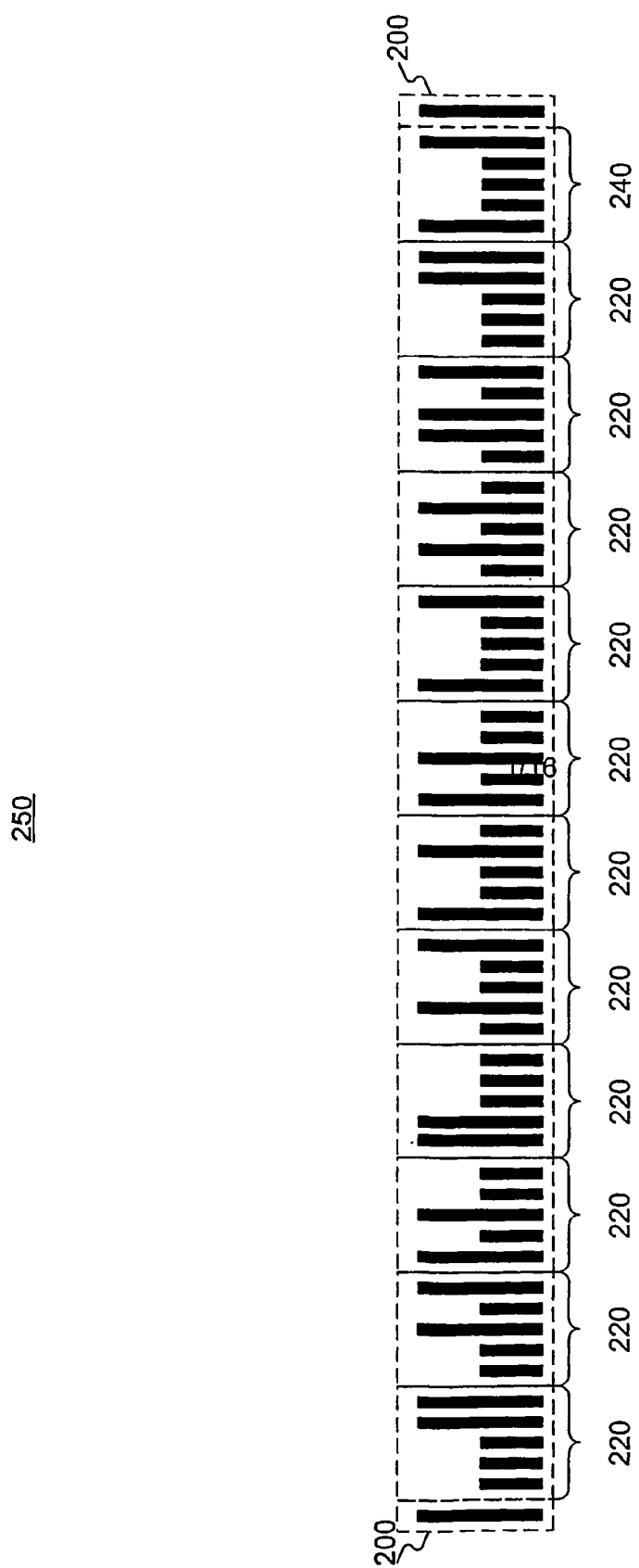
FIG. 2 is a block diagram illustrating a first bar code.
Figure 6:
FIG. 6 is a diagram comparing two types of bar codes.
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:
Figure 6:

FIG. 2 is a block diagram illustrating a first bar code. First barcode 250 may include one boundary bar or side bar 200 at each end of the code and twelve digits, consisting of eleven numerical digits 220 and one checksum digit 240, between the two side bars 200. Each digit 220 and 240 may have a combination of two tall and three short bars that form a pattern representing a number between zero and nine. FIG. 6, described in greater detail later, shows an exemplary conversion between the pattern for a digit and the number.

Item processing center 20 may designate the last digit of the barcode as checksum digit 240 to detect errors while processing the barcode. Specifically, checksum digit 240 may be set as the number that causes a sum of the twelve digits in the barcode to be a multiple of 10. Thus, during processing, item processing center 20 may detect an error when a sum of the digits does not result in a multiple of ten.

When taken in sequence, the twelve numbers derived from the twelve digits of the first barcode 250 comprise a digital delivery address, such as a zone improvement plan (ZIP) code, that aids item processing center 20 in delivering an item to its delivery address.

Figure 3:
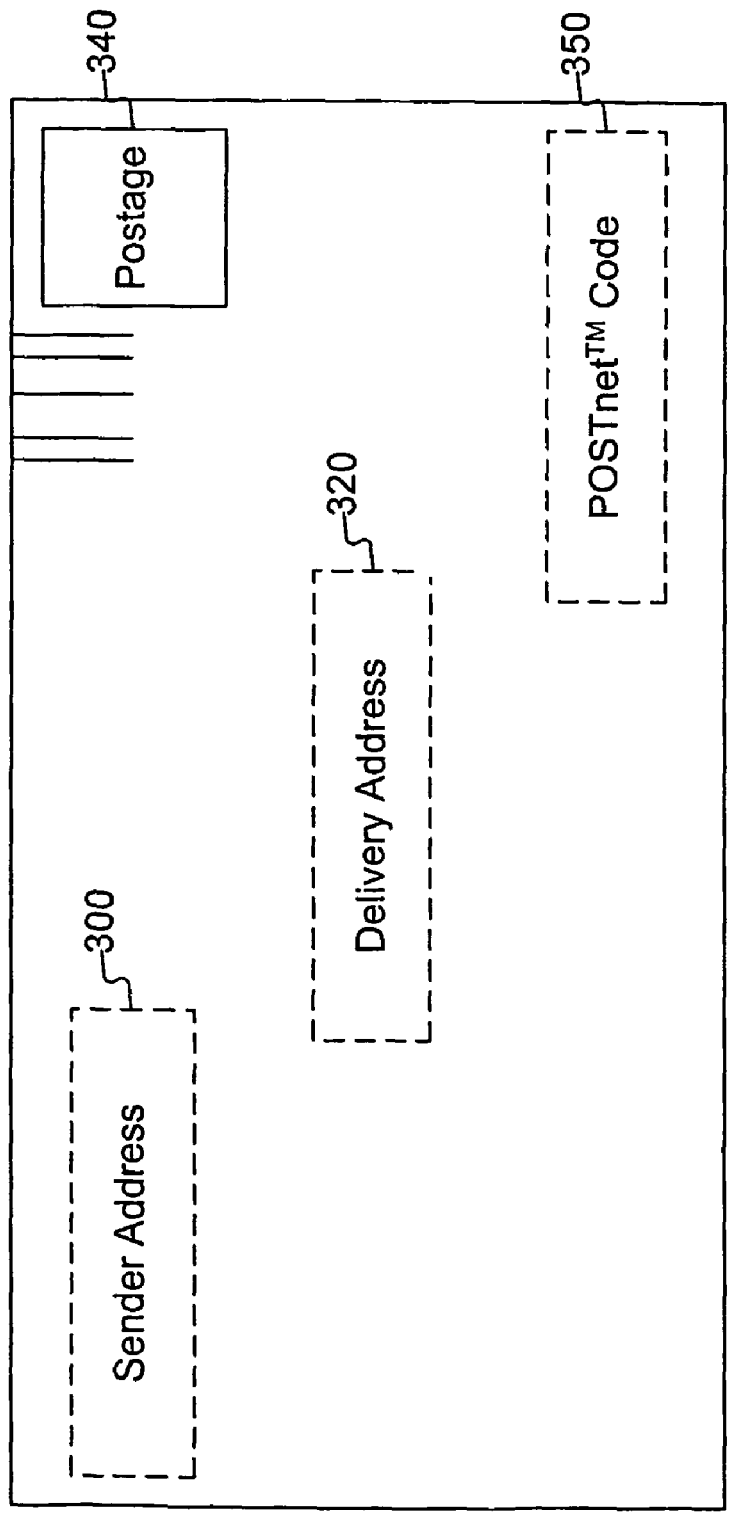
FIG. 3 is a diagram generally illustrating a front face of an item utilizing the conventional barcode technology.

FIG. 3 is a diagram generally illustrating a front face of an item utilizing the conventional barcode technology. The front face of the item may include a sender address 300, a delivery address 320, an appropriate shipping fee or postage 340, and a first barcode 250. First barcode 250 may be used by item processing center 20 as a digital delivery address for aiding the sortation and delivery of the item from sender address 300 to delivery address 320. First barcode 250 may be printed on the front face of the item, or it may be attached thereto using a label. Typically, first barcode 250 is located at the lower right corner on the front face of the article, as shown in FIG. 1.

One improvement on the conventional first barcode technology may be achieved by electronically providing a second barcode to an item to uniquely relate an item to a customer and provide tracking information regarding the item to the customer. In this manner, the customer may track incoming or outgoing items or a combination thereof. Particularly, the customer may affix or print a first barcode and a second barcode to an item. An item processing center may process the codes in combination to record information regarding the processing of an item associated with a particular customer and provide the customer with the recorded information. Customers may access the information over a network connection to a web site or by downloading the files using file transfer protocol (FTP).

Figure 4:
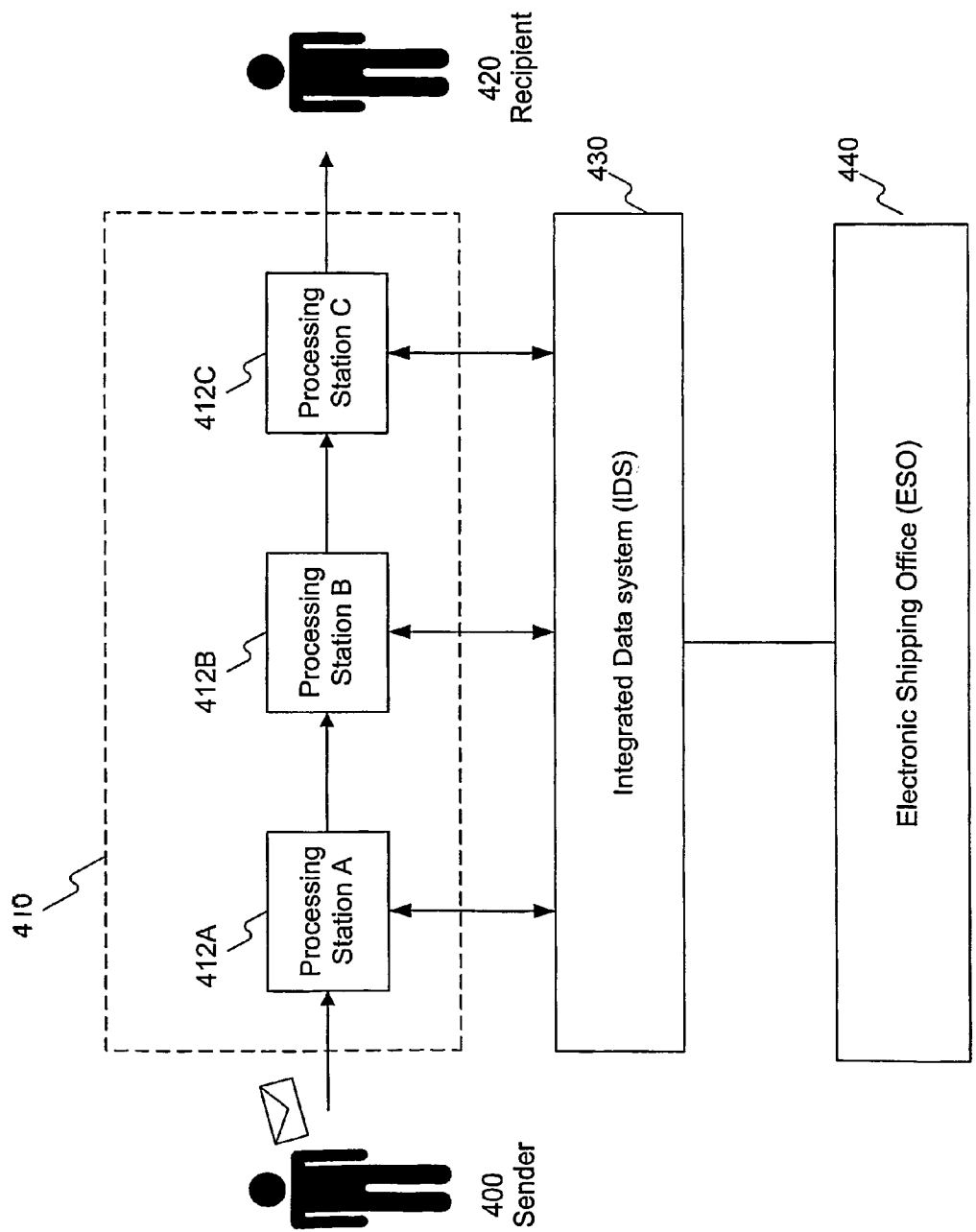
FIG. 4 is a block diagram illustrating a customer submitting an item in a shipping and tracking system.

FIG. 4 is a block diagram illustrating a customer submitting an item in a shipping and tracking system. The system may include a sender 400, an item processing service 410 comprising processing stations A-C 412A, 412B, and 412C, an integrated data system (IDS) 430, an electronic shipping office (ESO) 440, and a recipient 420. IDS 430 may connect processing stations A-C 412A, 412B, and 412C at a centralized location, allowing information regarding an item to be stored.

After an item is received from sender 400 at item processing service 410, processing station A 412A, for example, may scan a first barcode and a second barcode on an item to uniquely identify the item in IDS 430 and upload information into IDS 430 regarding the item. For example, processing station A may upload information regarding its location, such as its facility identification or zip code, along with a date and time for processing the item.

Similarly, processing stations B and C each may scan the first barcode and the second barcode on the item to identify the item in IDS 430 and upload updated information, regarding the location or identity of the processing station, and a date and time for processing the item. In this manner, an item may be tracked throughout the delivery process. IDS 430 may forward the tracking information to ESO 440, where it may be accessed by a customer associated with the item.

Figure 5:
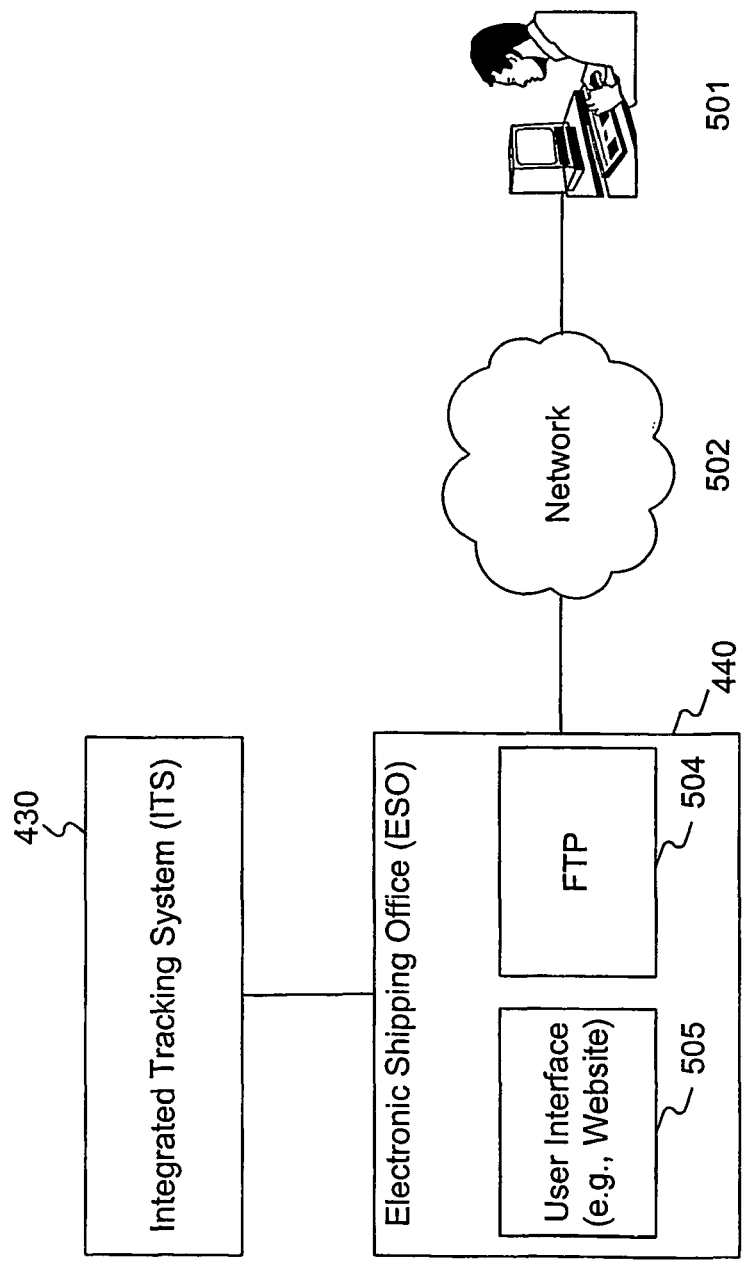
FIG. 5 is a diagram illustrating a system allowing a customer to electronically access item processing information.

FIG. 5 is a diagram illustrating a system allowing a customer to electronically access item processing information. The system may include a subscriber 501, a network 502, an electronic shipping office (ESO) 440 comprising a user interface or website 505 and a FTP 504, and IDS 430. Subscriber 501 may include a customer who wishes to receive tracking information regarding outgoing items or incoming items. FIG. 5 depicts that the customer may connect to ESO 440 via network 502. ESO 440 may include data received from IDS 430. The data may be received at ESO 440 continuously or periodically throughout the day. Subscriber 501 may obtain tracking information by accessing website 505 at ESO 440 and downloading the information or, for larger files, receiving the tracking information by FTP 504. If subscriber chooses to receive direct FTP access for data, the client may provide the Internet Protocol (IP) address and name of his FTP server, as well as a customer system username and password, a desired schedule for receiving the data, and a directory name for storing the data.

FIG. 6 is a diagram comparing two types of bar codes. FIG. 6 shows that a digit in the first barcode may be inversely related to a digit representing the same number in the second barcode by switching tall bars for short bars and short bars for tall. For example, a sequence comprising tall, tall, short, short, and short represents the number zero in the first barcode, whereas a sequence comprising short, short, tall, tall, and tall represents the number zero in the second barcode. Likewise, a sequence comprising short, tall, short, tall, and short represents the number five in the first barcode, whereas a sequence comprising tall, short, tall, short, and tall represents the number five in the second barcode. By using current barcoding methods for the first barcode, the second barcode is easy and inexpensive to apply.

Although not shown, the first barcode and the second barcode may be configured further to represent alphabetical characters. For example, using the code provided in FIG. 6, the letter "A" may be represented by a two digit numeric combination, such as 11. Similarly, the letter "B" may be represented by the two digit combination "22," and so on. One skilled in the art can readily recognize that other alpha numeric schemes are possible.

As described above, subscriber 501 may enroll in a service for receiving information regarding incoming items, which may be called an origin confirmation service, or a service for receiving information regarding outgoing items, which may be called destination confirmation service. Each of the services may provide the subscriber with a date and time that an item was last processed, a processing station 412A-412C where the item was last processed, and first barcode 250 and second barcode 700 information. The origin confirmation service and destination confirmation service are discussed in greater detail below with reference to FIGS. 7A, 7B, 8A, and 8B, respectively.

Figure 7A:
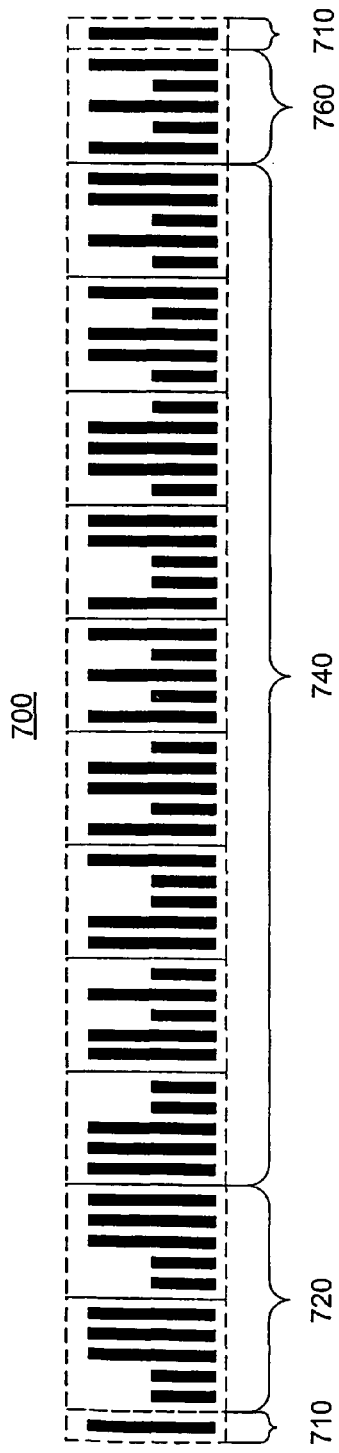
FIG. 7A is a diagram generally illustrating a second barcode for an origin confirmation service.

FIG. 7A is a diagram generally illustrating a second barcode for an origin confirmation service. FIG. 7A depicts second barcode 700 may include a side bar 710 at each end of the code and twelve digits, consisting of a two digit service plan 720, a nine digit identification 740, and a check digit 760. Further second barcode 700 may have a combination of three tall and two short bars that form a pattern representing a number between zero and nine, as shown in FIG. 6.

Referring back to FIG. 7, service plan 720 may identify the type of service plan subscriber 501 receives. To identify origin confirmation service, the two digit service plan 720 may represent the number "21." Like the first barcode, the last digit of the second barcode may be designated as checksum 760 to detect errors while processing the barcode. Specifically, checksum 760 may be set as the number that causes a sum of the twelve digits in the barcode to be a multiple of 10. Thus, during processing, the shipping company or, more particularly, item processing center 410 may detect an error when a sum of the digits does not result in a multiple of ten.

By using a first barcode, such as a POSTnet™ code, which includes a digital version of the delivery address, a shipping company, more particularly, IDS 430, may identify a subscriber of the origin confirmation service, which provides information regarding an incoming item, by the first barcode on the item. Thus, IDS 430 does not need any digits in the second barcode to identify the subscriber for providing item processing information, and nine digit identification 740 may remain available to the subscriber for his own use in identifying the item. For example, the subscriber may identify a recipient, particular shipment, or other information for linking the item to an established information database (not shown).

As described with reference with FIG. 4, IDS 430 may collect and report data to subscriber 501 via ESO 440. The data may include all processing information related to the processing of the item beginning at processing station A, the station that first processes an individual item. Thus, using the origin confirmation service, a subscriber may know when payments, orders, and responses are on their way and who sent them. By knowing this processing information, subscribers may optimize resources in advance of actual receipt of the items.

For instance, a mail order company origin confirmation service subscriber may optimize staffing and inventory levels when an order is on the way, thereby saving money and improving the quality of service for the customer. Additionally, a financial business or other company that processes payments, may better manage cash flow and staff processing centers based on information regarding estimated arrival dates of incoming bill payments. For example, a utility company, having knowledge that a late payment is arriving, may avoid dispatching personnel to physically shut off service, thereby avoiding unnecessary fees.

The origin confirmation service may also allow mail marketers to evaluate the success of ad campaigns by monitoring the frequency and/or speed with which a customer or zip code area responds to a solicitation. The evaluated information may be used to improve the targeting of the mail campaign, for example.

Figure 7B:
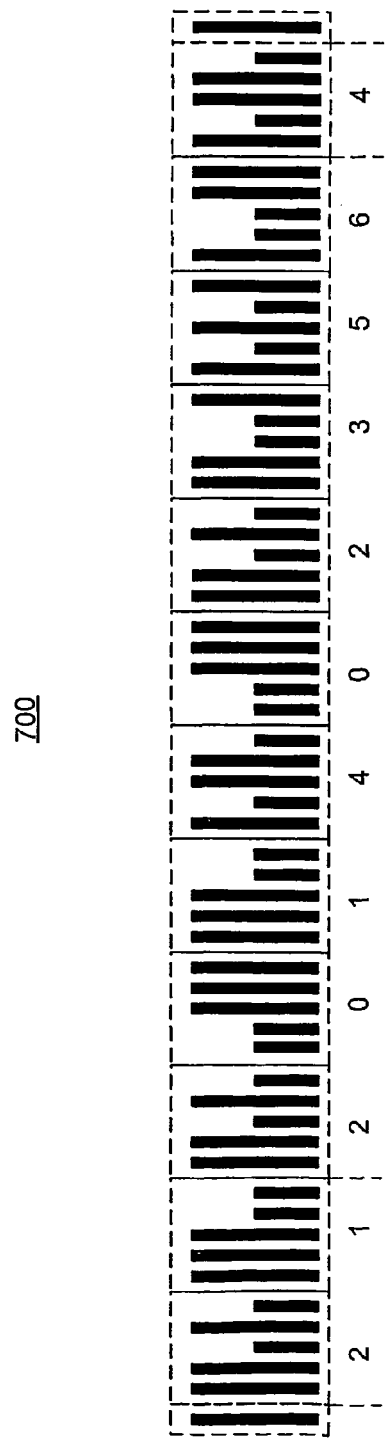
FIG. 7B is a diagram illustrating an exemplary embodiment of the origin confirmation system.

FIG. 7B is a diagram illustrating an exemplary embodiment of the origin confirmation system. Using FIG. 6 to translate the second barcode 700, FIG. 7B shows the two digit service plan 720 represents the number "21" designating origin confirmation service, nine digit identification 740 represents the number "201-402-356," and one digit checksum 560 represents the number "4." Adding each of the twelve digits yields 30, a multiple of 10. Thus, the exemplary second barcode 700 appears free of single-bit errors.

Figure 8A:
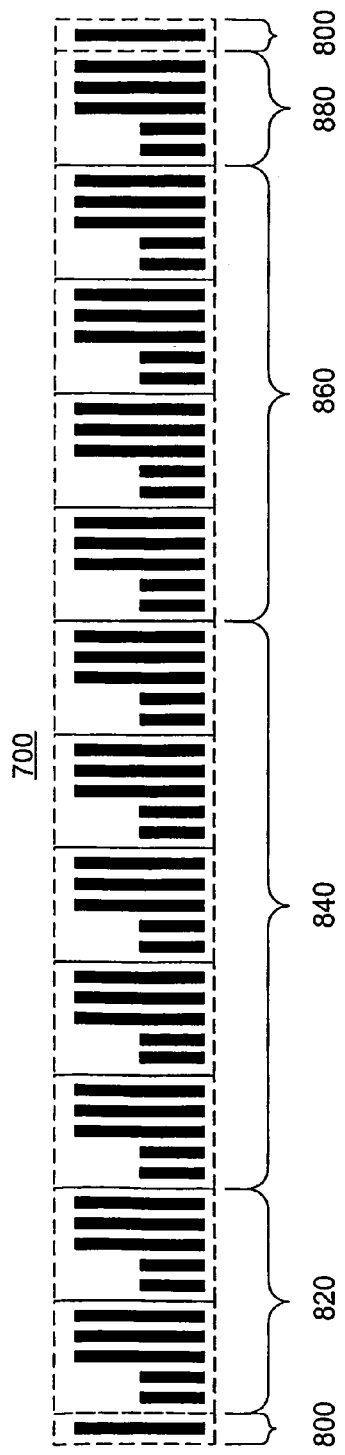
FIG. 8A is a diagram generally illustrating a second barcode for a destination confirmation service.

FIG. 8A is a diagram generally illustrating a second barcode for a destination confirmation service. FIG. 8A depicts second barcode 700 may include a side bar 800 at each end of the code and twelve digits, consisting of a two digit service plan 820, a five digit subscriber 840, a four digit tracking 860, and an one digit checksum 880, between the two side bars 800. Five-digit subscriber 840 may include a five-digit subscriber identification assigned by the USPS to identify destination confirmation service subscribers. Four-digit tracking 860 may include a four-digit field defined by the sender to help identify the item. Service plan 820 may represent the number "22" to designate the service as destination confirmation service.

As described with reference with FIG. 4, a shipping company, more particularly IDS 430, may collect and report data to subscriber 501 via ESO 440. The data may include all processing information related to the processing of the item. Thus, destination confirmation service may store information regarding the last machine handling the item before delivery, for example. Destination confirmation service may provide added assurance to a subscriber that a recipient will receive an outgoing item. For example, a credit card company or sender of other "high value" items, such as mail pieces, may ensure its items are sorted at the proper destination facility and properly delivered to reduce credit card fraud or other mail fraud.

In addition, a marketer may use the destination confirmation service to better synchronize a follow-up phone call or e-mail after delivery of a particular solicitation, thereby enhancing sales. Marketers may further evaluate the delivery information to identify delivery days of the week that are best for generating a positive response from potential customers, for example. Further, a company may use the information to optimize staffing after delivering invoices to handle billing inquiries. Alternatively, the subscriber may evaluate the processed item delivery options to identify delivery trends by zip code or a geographical market segment.

Figure 8B:
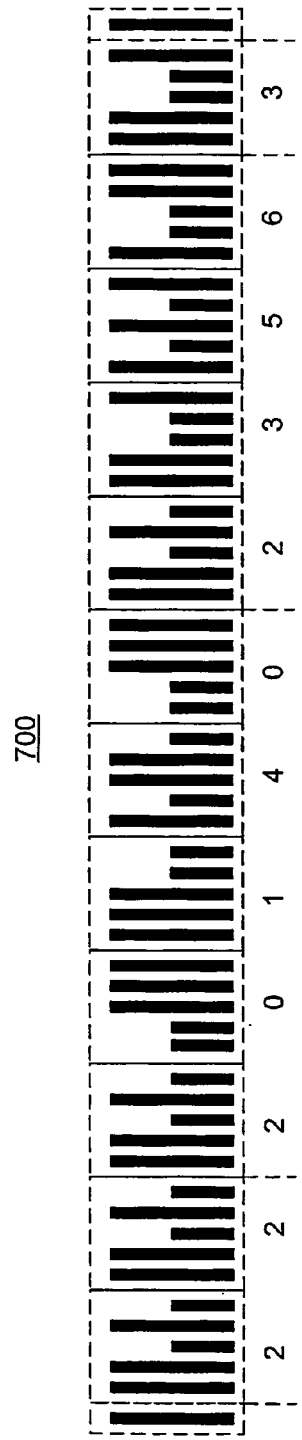
FIG. 8B is a diagram illustrating an exemplary embodiment of the destination confirmation service.

FIG. 8B is a diagram illustrating an exemplary embodiment of the destination confirmation service. Using FIG. 6 to translate the second barcode 700, FIG. 8B shows the two digit service plan 820 represents the number "22" designating destination confirmation service, five digit subscriber 840 represents the number "20-140," four digit tracking 860 represents the number "2-356," and one digit checksum 560 represents the number "3." Adding each of the twelve digits yields 30, a multiple of 10. Thus, the exemplary second barcode 700 appears free of single-bit errors.

FIG. 9 is a block diagram illustrating an exemplary output provided to subscribers to an origin or destination confirmation service. The output may include an item processing plant 900, such as a sectional center facility (SCF) that serves the delivery address on the item, an operation number 910, a date the item was processed 920, a time the item was processed 930, first barcode 250, and second barcode 700. For example, item processing plant 900 may indicate a zip code of the item processing plant in which the item was processed. Operation number 910 may indicate the type of operation or level of sortation, such as a primary sortation for incoming items, performed on the item. A list of various operation numbers may be obtained from the shipping company. The time that the item was processed 930 is indicated in an hour to minute format (HH:MM). However, in an alternative embodiment, the time 930 may be configured to show hours, minutes, and seconds. The first barcode 250 and a second barcode 700 may be used by the subscriber to identify a particular item. In another embodiment, a subscriber may be able to get the data scrubbed before delivery. For example, scrubbing the data may help reduce the amount of data provided to the subscriber or may summarize some of the data provided.

Figure 10A:
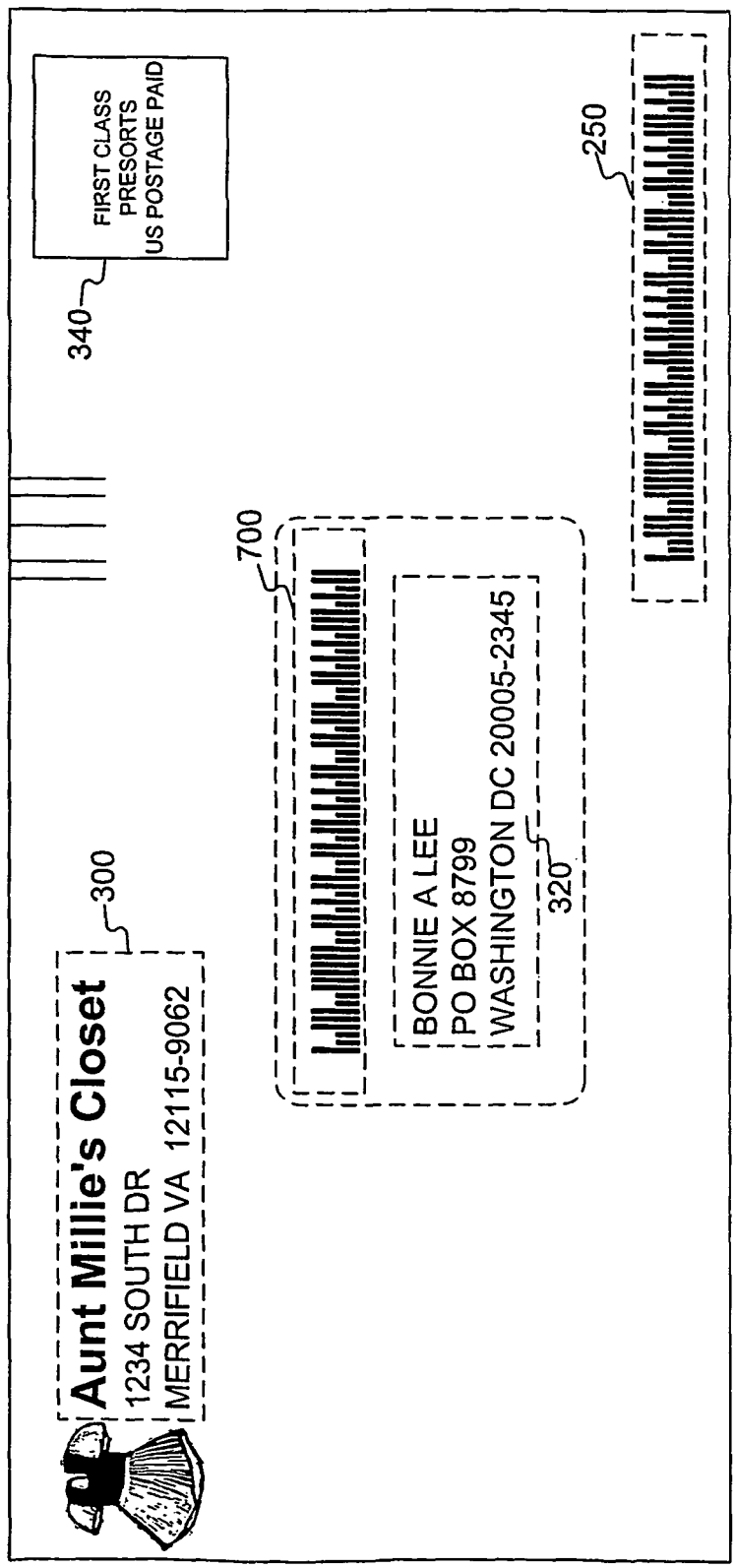
FIGS. 10A and 10B are diagrams illustrating various embodiments of a front face of an item.
Figure 10B:
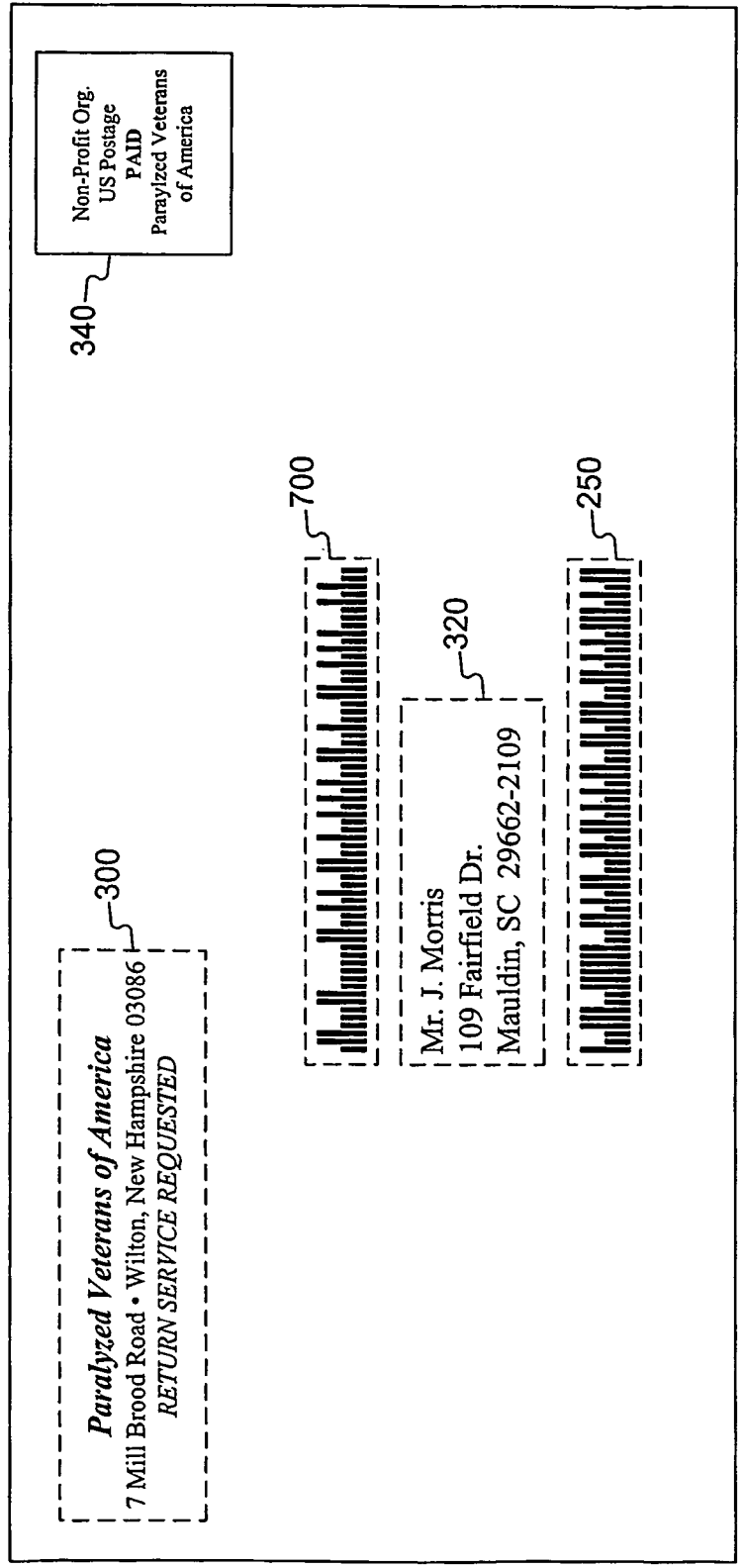

FIGS. 10A and 10B are diagrams illustrating various embodiments of a front face of an item. FIGS. 10A and 10B show the front face of the item may include a sender or return address 300, a delivery address 320, an appropriate shipping fee or postage 340, a first barcode 250, and a second barcode 700. First barcode 250 and second barcode 700 may be printed on or attached to the front face of the item by the customer. First barcode 250 and second barcode 700 may be used in combination to identify an item, record information associated with the item, and provide electronic access to a customer associated with the item.

In one embodiment, FIG. 10A shows second barcode 700 located above delivery address 320 and first barcode 250 located at the lower right corner on the front face of the item. In another embodiment, FIG. 4B shows second barcode 700 located above delivery address 320, and first barcode 250 located below delivery address 320. In yet another embodiment, not shown, second barcode 700 may be located below delivery address 320, and first barcode 250 and second barcode 700 are not restricted to the embodiments described above. In general, the codes 250 and 700 may be placed at any designated location of the item. For example, in another embodiment, second barcode 700 may be located anywhere except the lower right corner on the front face of the item, which is designated for first barcode 250. In still another embodiment, first barcode 700 may be placed above or below a keyline. A keyline may contain specific information about the item and may be printed two or more lines above delivery address 320, for example. In still another embodiment, the first and second barcodes may be located within the address block of the item as designated by the shipping company's specifications.

Although the above system has been described with reference to service plans 720 corresponding to origin confirmation service or destination confirmation service, one skilled in the art will readily recognize that numerous the service plans may be expanded to aide the identification process. For example, in another embodiment, the two digit service plan may be expanded to include additional numerals, representing a first class letter for origin confirmation service, a first class flat for origin confirmation service, a standard mail letter for origin confirmation service, a standard flat for origin confirmation service, a first class letter for destination confirmation service, a first class flat for destination confirmation service, a standard mail letter for destination confirmation service, a standard flat for destination confirmation service, etc. Similarly, in yet another embodiment, the two digit service plan may include a numeral representing a subscriber who receives confirmation service for incoming and outgoing items. Accordingly, the present invention is not limited to the particular service plans provided herein.

Although items may usually be processed by processing station A on the same day of arrival, it is possible for there to be a delay between an arrival of a an item and processing of the item at the processing station A. Thus, it is desirable to provide an arrival date for destination confirmation service, indicating an arrival date for an entire shipment that includes the item being tracked. With this information, the shipping company may provide further features to the subscriber, such as a confirmation that the shipping company has taken possession of a shipment. Further, the shipping company may evaluate this information to build trend and statistical information about the performance of the confirmation service and overall item processing. For example, the shipping company may compare the number of items deposited for processing to the number of items scanned by the confirmation service to determine how many pieces are not properly tracked by the confirmation service. Further, the shipping company may determine the length of time items, in general, take for processing after arrival at the shipping company.

To determine an arrival of an item before physically processing the individual item, the shipping company may receive a file, such as an advance shipping notice (ASN) data file, providing information regarding an anticipated drop data for a shipment including the item. The ASN file may indicate a shipment identification identifying the shipment and a customer identification identifying the customer associated with the shipment, along with other information, such as, for example, an estimated drop date. Thus, when the shipment arrives at a shipping company's facility with a shipment identification barcode on a form accompany the shipment, for example, the shipping company may scan the shipment identification barcode and use the information in the ASN file to link the shipment with a customer before processing an individual item in the shipment. The shipping company may notify the customer when the shipment arrives before processing the item.

In an embodiment of the present invention, the ASN file may be prepared by a sender or by a company on behalf of the sender (i.e., a consolidator). In an embodiment of the present invention, the file may be provided to the shipping company electronically.

In an embodiment of the present invention, the item may be verified at the sender's premises before the shipping company takes possession. During verification, a shipment of items may be weighed to determine the total weight of the items and the required shipping fee or postage, for example. In another embodiment of the present invention, the items may be verified at a facility of the shipping company.

FIGS. 11a, 11b, 11c, and 11d are diagrams illustrating various embodiments of advance shipping notice (ASN) data that may be provided in a ASN data file by a subscriber for verified items according to the present invention. The ASN data may include shipment identification 1102, facility code 1104, estimated drop date 1106, estimated drop time 1108, appointment number 1110, subscriber identification 1112, items identification 1114, items name 1116, service code 1118, number second barcodes 1120, total number of items dropped 1122, delivery window start date 1124, delivery window end date 1126, presort level 1128, second barcode 1130, and a number items second barcode coded 1132. The ASN data may be stored in an ASN data file provided electronically by a subscriber to the shipping company. Alternatively, a hard copy of the file may be provided to the shipping company. In an embodiment of the invention, ASN data file may include a single data file in comma delimited format, each record consisting of the 16 data elements or fields listed above. One skilled in the art, however, recognizes that the present invention is not limited to this data file format. The file may be delimited by tabs or spaces, or the file may include multiple files, for example. Each ASN data film may have one or more shipments, and each shipment may have at least one second barcode.

Shipment identification 1102, facility code 1104, estimated drop date 1106, estimated drop time 1108, and appointment number 1110 are shipping elements regarding the shipment. Shipment Identification 1102 may be a twenty digit alphanumeric code that uniquely identifies a single shipment or drop. This number is discussed in greater detail below with reference to FIG. 12. Facility code 1104 may be a five digit numeric code that represents a shipping company facility where the shipment is dropped. For example, a zip code of the facility may represent a facility (e.g., Northern Virginia processing and distribution center (P&DC)=22081). If the shipment is dropped at another facility, the second drop represents a separate shipment that requires another ASN form. Estimated drop date 1106 may include an eight digit numeric code in a format MMDDYYYY that represents a date the item is dropped at the shipping company facility. Estimated drop time 1108 may include a four digit numeric code in a format HHMM that represents a time the shipment is dropped at the shipping company facility. Estimated drop time 1108 may be an optional feature. Appointment number 1110 may include a twelve digit appointment number assigned by a drop ship appointment system (DSAS) that corresponds to the shipment. The appointment number may not be required for all shipments.

Elements related to the item may include subscriber identification 1112, items identification 1114, items name 1116, service code 1118, number second barcodes 1120, total number of items dropped 1122, delivery window start date 1124, delivery window end date 1126, presort level 1128, second barcode 1130, and number of items second barcode coded 1132. Subscriber identification 1112 may include a nine digit numeric subscriber identification assigned by the shipping company. The value assigned by the shipping company may be padded with leading zeros to nine digits. For example, an assigned value "12-345" should be zero padded as "000-012-345."

Items identification 1114 may include an eight digit numeric unique identifier assigned by the customer for the items shipped. The value may be padded with leading zeros to eight digits. Items name 1116 may include a 50 digit alphanumeric items name describing the items shipped. Service code 1118 may include a two digit numeric service plan identification, similar to service plan 720 or 820 of the second barcode. For example, subscribers for destination confirmation may use numerals 40 to 49 to indicate a particular type of service for the item being tracked, such as "40" for first class letters, "41" for first class flats, "42" for standard letters, "43" for standard flats, "44" for periodicals letters, and "45" for periodical flats, etc.

Number of second barcodes 1120 may include a four digit numeric value representing the number of different second barcode codes the shipment contains. The value may be padded with leading zeros to four digits. Total number of items dropped 1122 may include the total number of items the shipment contains. Delivery window start date 1124 and delivery window end date 1126 each may include an eight digit numeric value in the format MMDDYYYY, representing the first and last day of an in-home delivery window, respectively. An in-home delivery window may represent the sender's desired date range for delivery of the item, for example. Delivery window start date 1124 and delivery window end date 1126 may be included at the option of the sender.

Presort level 1128 may include a three digit numeric value indicating a predominant presort level of items. Presort level may indicate the level that a sender has items sorted on his facilities, rather than the shipping company's facilities, in exchange for reduced rates. For example, senders that presort items at their premises for immediate delivery by the shipping company may receive a deeper discount than senders who provide a primary sortation that requires further sortation by the shipping company. Presort level 1128 may be an optional feature for a sender. Second barcode 1130, which may correspond to second barcode 700 described earlier, may be included as an eleven digit numeric code, i.e., the code without the checksum digit. Although the second barcode has been described as an eleven digit code, one reasonably skilled in the art can recognize that the length of the code may be expanded to 13 digits (plus a checksum digit) to provide enhanced services. Number of items second barcode coded 1132 may include a nine digit numeric code for identifying the items that are tagged with the second barcode in the shipment. The value may be padded with leading zeros to nine digits.

FIG. 11A shows an exemplary advance shipping notice (ASN) file in accordance with an embodiment of the present invention. ASN file 1100A is an exemplary file representing a single shipment 1134A that is sent to a single shipment company facility 1104. As shown in FIG. 11A, the shipment may include one second barcode "43-123-450-246" (e.g., second barcode 1130) that is associated with 9,900,000 items (e.g., number of items second barcode coded 1132) of the 9,900,000 pieces dropped (e.g., total number of items dropped 1122) for shipment at facility "36106" (e.g., facility code 1104) on May 10, 2001 (e.g., estimated drop date 1106) at 4 p.m (e.g., estimated drop date 1108). The subscriber identification 1112 for the items drop is customer number "12-345."

FIG. 11B shows an exemplary advance shipping notice (ASN) file in accordance with another embodiment of the present invention. ASN file 1100B is an exemplary file representing four shipments each sent to a different shipping company facility 1104. A sender, such as sender 400, may generate a separate record for each facility, such as records 1134B, 1136B, 1138B, and 1140B, associated with shipments 1-4, respectively. The records may be combined into one ASN file 1100B, as shown in FIG. 11B, or the records may be placed in separate files, similar to FIG. 11A. If the records are placed in separate files, number of second barcodes 1120 may change from "0004" to "0001", for example.

FIG. 11B shows each drop may have unique features, such as a separate second barcodes 1132, separate drop date, etc. For example, shipment 4 1140B dropped at facility "36106" (e.g., facility code 1104) has a second barcode "43-123-450-246" (e.g., second barcode 1130), whereas shipment 3 1138B dropped at facility "22042" (e.g., facility code 1104) has a second barcode "43-123-450-247" (e.g., second barcode 1130), for example. Further, the estimated drop date 1106 for shipment 4 1140B dropped at facility "36106" (e.g., facility code 1104) is a day before the estimated drop date 1106 for shipment 3 1138B dropped at facility "22042" (e.g., facility code 1104), and shipment identification 1102 for shipment 4 differs from shipment identification 1102 for shipment 3. The subscriber identity 1112 for both shipments is customer number "12345."

FIG. 11C shows an exemplary advance shipping notice (ASN) file in accordance with another embodiment of the present invention. ASN file 1100C is an exemplary file representing four shipments sent to the same shipping company facility 1104 from different sending companies. Typically, each sending company may submit a ASN file separately to the shipping company facility 1104, as shown in FIG. 11A, for example. However, in the embodiment depicted in FIG. 11C, a consolidator may group items from separate item producers or senders for a single drop to a specific shipping company facility 1104. Thus, a record associated with each subscriber 1134C, 1136C, 1138C, and 1140C may have a separate second barcode 1132 and subscriber identity 1112, and the same shipment identification 1102, estimated drop date 1106, estimated drop time 1108, and facility code 1104, for example. Also, although ASN file 1100C contains four records, each subscriber shown only has one shipment. Therefore, FIG. 11C correctly shows the number of second barcodes 1120 as 1 for each record 1134C, 1136C, 1138C, and 1140C.

FIG. 11D shows an exemplary advance shipping notice (ASN) file in accordance with yet another embodiment of the present invention. ASN file 1100D is an exemplary file representing four shipments with the same second barcode 1130 that are sent to different shipping company facilities 1104. In this example, each shipment recorded may be a portion of a larger shipment. To utilize a single second barcode on items dropped at multiple locations, a sender may drop items at facilities that serve as a final destination for each item. A sender, such as sender 400, may generate a separate record for each facility, such as records 1134D, 1136D, 1138D, and 1140D, associated with shipments 1-4, respectively. The records may be combined into one ASN file 1100D, as shown in FIG. 11D.

The present invention is not limited to the embodiments specifically described herein. One reasonably skilled in the art can readily recognize several embodiments of the present invention. For example, in another embodiment, not shown, the shipment may be verified at a shipping company facility, rather than a sender's facility. If the shipment is verified at a shipping company facility, an application of the shipment identification may differ from a shipment identification provided by the sender. For example, the sender may affix a shipment identification barcode on a new form (not shown) that will be presented along with a required shipping fee or postage statement. The other data in the ASN file may remain unchanged from that shown in FIG. 11A, for example.

Figure 12:
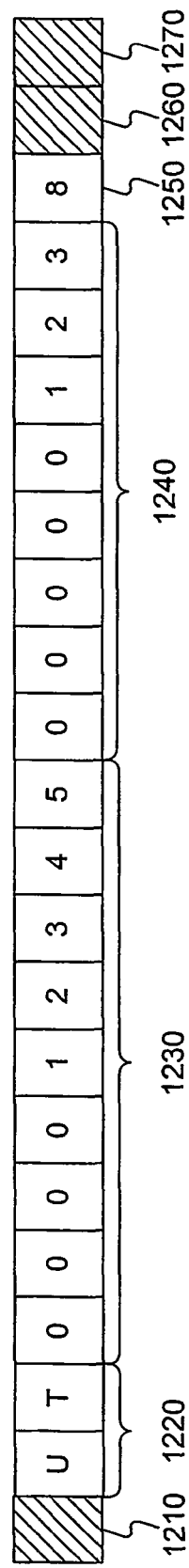
FIG. 12 is a diagram illustrating an exemplary shipment identification.

FIG. 12 is a diagram illustrating an exemplary shipment identification. Shipment identification 1102 may include a start code 1210, service type code 1220, subscriber identification 1230, sequential shipment identification 1240, first check digit 1250, second check digit 1260 and stop code 1270. In an embodiment of the invention, shipment identification 1102 may use a uniform symbology specification (USS) code 128, subset B, which is defined in AIM uniform symbology specifications. Start code 1210 and stop code 1270 may include one digit symbolic codes that begin and end the barcode, respectively. The start code 1210 and stop code 1270 may have a format that is not human readable nor manually keyed or transmitted. Service type code may be a two digit character of UT.

In an embodiment of the present invention, subscriber identification 1230 may include a nine digit numeric value assigned to a subscriber by the shipping company. Specifically, the destination confirmation subscriber identification provided by the shipping company may be padded with leading zeros to nine digits to form subscriber identification 1230. In another embodiment of the present invention, subscriber identification 1230 may include a nine-digit numeric subscriber identification assigned by the shipping company to a company that creates an ASN file on behalf of a confirmation subscriber (i.e., a consolidator) and subscribers to Confirm®. In still another embodiment of the present invention, subscriber identification 1230 may include a number, such as a nine-digit D-U-N-S number, identifying a company that creates the ASN file on behalf of a confirmation subscriber (i.e., a consolidator). The D-U-N-S number, assigned to a company by Dun & Bradstreet, uniquely identifies business entities at specific physical entities. Thus, a consolidator generating shipments at multiple locations may use the D-U-N-S number appropriate for each shipping location as subscriber identification 1230.

Sequential shipment identification 1240 may include an eight-digit number. Sequential shipment identification 1240 may increase sequentially for each shipment sent by the sender, for example. In an embodiment of the present invention, the value for sequential shipment identification 1240 may remain unique for at least a year.

First check digit 1250 may include a one digit numeric value that is a MOD 10 check digit. To calculate the check digit, numeric values at even and odd positions of shipment code 1220 may be added separately (leaving a value of check digit 1250 as "0"), a value of the even sum may be multiplied by three, and the result may be added to the value of the odd sum to determine a base number. A smallest number that may be added to the base number to produce a multiple of 10 may be the check digit. Even and odd positions of 20-digit shipment identification 1102 may be determined by assigning a position of "1" to the rightmost digit, first check digit 1250, and assigning consecutive position values to the digits to the left, such that the first character "U" of service type code 1220 has a position of "22," because each character (e.g., "U" and "T") is represented numerically using two digits. Particularly, characters of shipment identification 1102 may be converted to numbers using table 2 of the code 128 symbol character found in the AIM uniform symbology specification code 128. For example, the letters "U" and "T" of service type code 1220 have the two digit numerical representations "53" and "52," respectively. Thus, for the exemplary shipment identification 1102 shown in FIG. 12, adding the even positions (e.g., 5+5+0+0+1+3+5+0+0+1+3) yields 23, adding the odd positions (e.g., 3+2+0+0+2+4+0+0+0+2+0 for the check digit) yields 13. Multiplying the even sum by 3 yields and adding the result to the odd sum yields 92. Thus, a value of "8" for first check digit 1250 results in a digit that is a multiple of 10.

Second check digit 1262 may represent a MOD 103 check digit that is unique to the Code 128 symbology. For example, second check digit 1262 may be positioned as the last digit of shipment identification 1102; however, it may have a form that is not human readable, manually keyed, nor transmitted as data. Accordingly, second check digit 1262 may be considered overhead that is not a data element.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A non-transitory computer-readable medium configured to execute a method for providing tracking information for an item shipped by a sender, comprising:

receiving an advance shipping notice data file comprising anticipated arrival information from the sender regarding an anticipated arrival of a shipment comprising a plurality of items, each item comprising a first barcode and a second barcode, wherein the anticipated arrival information includes:

an anticipated drop date for the anticipated shipment comprising the plurality of items, a predetermined shipment identification identifying the anticipated shipment, and a predetermined sender identification identifying the sender;

receiving a first shipment with a first shipment identification;

comparing the first shipment identification to the predetermined shipment identification;

notifying the sender with confirmed arrival information confirming the arrival of each item in the first shipment when the first shipment identification matches the predetermined shipment identification; and scanning the first barcode and the second barcode of each item, the first barcode being utilized by a delivery service provider for delivering the item, and the second barcode not being needed by the delivery service provider to deliver the item and comprising information provided by the sender.

2. The computer-readable medium of claim 1, wherein the method further comprises providing the sender with scanned information associated with the second barcode.

3. The computer-readable medium of claim 2, wherein the method further comprises providing the confirmed arrival information and the scanned information via a website.

4. The computer-readable medium of claim 2, wherein the method further comprises providing the confirmed arrival information and the scanned information via a file transfer protocol.

5. The computer-readable medium of claim 1, wherein the method further comprises providing the confirmed arrival information and the scanned information electronically.

6. The computer-readable medium of claim 1, wherein the method further comprises receiving the advance shipping notice data file electronically from the sender.

7. The computer-readable medium of claim 1, wherein the method further comprises receiving the advance shipping notice data file electronically from a company on behalf of the sender.

8. The computer-readable medium of claim 1, wherein the anticipated arrival information further includes at least one of:

a facility code indicating a receiving facility for the anticipated shipment; and an estimated drop time for the anticipated shipment.

9. The computer-readable medium of claim 1, wherein the anticipated arrival information further includes at least one of:

an items name providing a description of the anticipated shipment;

a service code indicating a level of service for the anticipated shipment;

a total items number indicating a total number of items dropped in the anticipated shipment;

a total track number indicating a total number of items dropped in the anticipated shipment for tracking;

a tracking identification indicating an identification associated with each item; and a presort level indicating a level of sortation for the anticipated shipment.

10. A computer-implemented method for providing tracking information for an item associated with a sender, comprising:

receiving, by a processor, an advance shipping notice data file comprising pre-arrival information from the sender regarding an anticipated arrival of a shipment comprising a plurality of items, each item comprising a first barcode and a second barcode, wherein the anticipated arrival information includes:

an anticipated drop date for the anticipated shipment comprising the plurality of items, a predetermined shipment identification identifying the anticipated shipment, and a predetermined sender identification identifying the sender;

receiving, by the processor, a first shipment with a first shipment identification;

comparing, by the processor, the first shipment identification to the predetermined shipment identification;

notifying, by the processor, the sender with confirmed arrival information confirming the arrival of each item in the first shipment when the first shipment identification matches the predetermined shipment identification; and scanning the first barcode and the second barcode of each item, the first barcode being utilized by a delivery service provider for delivering the item, and the second barcode not being needed by the delivery service provider to deliver the item and comprising information provided by the sender, wherein said notification further provides the sender with scanned information associated with the second barcode.

11. The computer-implemented method of claim 10, further comprising providing the confirmed arrival information and the scanned information via a website.

12. The computer-implemented method of claim 10, further comprising providing the confirmed arrival information and the scanned information via a file transfer protocol.

13. A system for providing tracking information for an item associated with a sender, comprising:

a processor; and a memory storing instructions executable by the processor to:

receive an advance shipping notice data file comprising pre-arrival information from the sender regarding an anticipated arrival of a shipment comprising a plurality of items, each item comprising a first barcode and a second barcode, wherein the anticipated arrival information includes:

an anticipated drop date for the anticipated shipment comprising the plurality of items, a predetermined shipment identification identifying the anticipated shipment, and a predetermined sender identification identifying the sender;

receive a first shipment with a first shipment identification;

compare the first shipment identification to the predetermined shipment identification;

notify the sender with confirmed arrival information confirming the arrival of each item in the first shipment when the first shipment identification matches the predetermined shipment identification; and scan the first barcode and the second barcode of each item, the first barcode being utilized by a delivery service provider for delivering the item, and the second barcode not being needed by the delivery service provider to deliver the item and comprising information provided by the sender, wherein said notification further provides the sender with scanned information associated with the second barcode.

* * * * *

UNITED STATES PATENT AND TRADEMARK OFFICE
CERTIFICATE OF CORRECTION

Page 1 of 1

PATENT NO. : 8,255,235 B2
APPLICATION NO. : 10/488762
DATED : August 28, 2012
INVENTOR(S) : Harry Aldstadt It is certified that error appears in the above-identified patent and that said Letters Patent is hereby corrected as shown below:

Title page, Item 57, Lines 2-3, "information may includes" should read --information may include--.

Claim 9, Column 13, Line 44, "an items name" should read --an item name--.

Signed and Sealed this
Twenty-third Day of October, 2012

David J. Kappos
*Director of the United States Patent and Trademark Office*